US012800699B2

(12) United States Patent
Wang et al.

(10) Patent No.: US 12,800,699 B2
(45) Date of Patent: Nov. 17, 2026

(54) SMART DEVICE CONTROL METHOD AND SYSTEM, ELECTRONIC DEVICE, AND STORAGE MEDIUM

(71) Applicant: Goertek Inc., Weifang (CN)

(72) Inventors: Xiaochen Wang, Weifang (CN); Xiaoyu Ge, Weifang (CN); Ke Dong, Weifang (CN)

(73) Assignee: Goertek Inc., Weifang (CN)

( * ) Notice: Subject to any disclaimer, the term of this patent is extended or adjusted under 35 U.S.C. 154(b) by 282 days.

(21) Appl. No.: 18/690,362

(22) PCT Filed: Sep. 19, 2022

(86) PCT No.: PCT/CN2022/119662

§ 371 (c)(1),
(2) Date: Mar. 8, 2024

(87) PCT Pub. No.: WO2023/051305

PCT Pub. Date: Apr. 6, 2023

(65) Prior Publication Data

US 2024/0426968 A1 Dec. 26, 2024

(30) Foreign Application Priority Data

Sep. 29, 2021 (CN) .......................... 202111149462.6

(51) Int. Cl.
*G01S 5/14* (2006.01)
*G01S 5/02* (2010.01)
*H04W 64/00* (2009.01)

(52) U.S. Cl.
CPC .............. *G01S 5/0284* (2013.01); *G01S 5/14* (2013.01); *H04W 64/003* (2013.01)

(58) Field of Classification Search
CPC .......... G01S 5/0284; G01S 5/14; G01S 11/02; G01S 11/12; G01S 5/16; H04W 64/003;
(Continued)

(56) References Cited

U.S. PATENT DOCUMENTS 10,627,860 B2 * 4/2020 Jacobsen ................ G05D 1/224
11,533,531 B1 * 12/2022 Link .................. H04N 21/4302
(Continued)

FOREIGN PATENT DOCUMENTS

CN 109144263 A 1/2019
CN 112987580 A 6/2021

*Primary Examiner* — Davetta W Goins
(74) *Attorney, Agent, or Firm* — Baker Botts LLP

(57) ABSTRACT

The subject matter includes a smart device control method, comprising: receiving a device control instruction, and acquiring device distance information respectively between the first positioning device and each smart device, and between the second positioning device and each smart device; calculating a LOS deviation angle between a wearer of the head-mounted device and each of the smart devices based on the device distance information, wherein the LOS deviation angle is an angle between the wearer's direct LOS and a relative direction of the device, and the relative direction of the device is a direction of a line connecting a midpoint of a connection between the first positioning device and the second positioning device to the smart devices; and determining a smart device with a LOS deviation angle less than a pre-set value as a to-be-controlled device, and sending a device control instruction to the to-be-controlled device.

9 Claims, 12 Drawing Sheets

(a)

(b)

(58) Field of Classification Search
CPC ....... Y02P 90/02; G05B 15/02; G05B 19/418; G05B 2219/2642
See application file for complete search history.

(56) References Cited

U.S. PATENT DOCUMENTS

| | | | | |
|---|---|---|---|---|
| 11,539,522 | B2 * | 12/2022 | Mars | G06Q 30/04 |
| 2016/0335981 | A1 * | 11/2016 | Koo | G09G 5/003 |
| 2019/0182415 | A1 | 6/2019 | Sivan | |
| 2023/0050547 | A1 * | 2/2023 | Nagar | G06F 3/013 |

* cited by examiner

SMART DEVICE CONTROL METHOD AND SYSTEM, ELECTRONIC DEVICE, AND STORAGE MEDIUM

CROSS-REFERENCE TO RELATED APPLICATIONS

The present disclosure is a National Stage of International Application No. PCT/CN2022/119662, filed on Sep. 19, 2021, which claims priority to Chinese Patent Application No. 202111149462.6, filed with the CNIPA on Sep. 29, 2021, and entitled "SMART DEVICE CONTROL METHOD AND SYSTEM, ELECTRONIC DEVICE, AND STORAGE MEDIUM", both of which are hereby incorporated by reference in their entireties.

TECHNICAL FIELD

The present disclosure relates to the field of human-computer interaction technologies, in particular to a smart device control method and system, an electronic device, and a storage medium.

BACKGROUND

With the popularity of the Internet of Things, more and more users tend to possess multiple smart devices concurrently. Meanwhile, there is also a possibility of providing multiple smart devices in a relatively small space. This raises great challenge on determination for accurate voice wake-up. For example, there is a risk of control confusion when a user simply issues an instruction "play music" while there are a plurality of smart devices around the user.

In related technologies, such determination is mainly based on the IoT broadband technologies, using only the distance between the user and the smart device as the basis for determination. In practical applications, there may be scenarios where a user actually wishes to interact with a distantly located smart device while another smart device is proximate to the user. For example, when a user wishes to turn on a distantly located air conditioner while there is a smart table lamp nearby, the user sends a simple instruction of "turn on" and the table lamp lights up: this is considered to be unfriendly from the perspective of interaction.

Therefore, how to achieve precise control of smart devices is a technical problem to be solved by those skilled in the art.

SUMMARY

The purpose of the present disclosure is to provide a smart device control method and system, an electronic device, and a storage medium that can achieve precise control of smart devices.

To solve the above-mentioned technical problems, the present disclosure provides a smart device control method applied to a head-mounted device, wherein the head-mounted device comprises a first positioning device and a second positioning device symmetrically arranged, and the smart device control method comprises:

Receiving a device control instruction, and acquiring device distance information respectively between the first positioning device and each smart device, and between the second positioning device and each smart device;

Calculating a LOS (Line of Sight) deviation angle between a wearer of the head-mounted device and each of the smart devices based on the device distance information, wherein the LOS deviation angle is an angle between the wearer's direct LOS and a relative direction of the device, and the relative direction of the device is a direction of a line connecting a midpoint of a connection between the first positioning device and the second positioning device to the smart devices; and Determining a smart device with a LOS deviation angle less than a pre-set value as a to-be-controlled device, and sending a device control instruction to the to-be-controlled device.

Optionally, determining the smart device with a LOS deviation angle less than a pre-set value as a to-be-controlled device comprises:

Setting the smart device with a LOS deviation angle less than the pre-set value as a candidate device;

If there are more than one candidate device, acquiring a pitch angle of the wearer; and Determining the to-be-controlled device from candidate devices according to the pitch angle of the wearer, wherein the pitch angle of the wearer is within a pre-set pitch angle range corresponding to the to-be-controlled device.

Optionally, acquiring the pitch angle of the wearer comprises:

Acquiring spatial position coordinates of the first positioning device, the second positioning device, and a third positioning device on the head-mounted device, wherein connection lines between the first positioning device, the second positioning device, and the third positioning device are not collinear; and Determining the pitch angle of the wearer according to the spatial position coordinates of the first positioning device, the second positioning device, and the third positioning device.

Optionally, acquiring the pitch angle of the wearer comprises:

Acquiring motion data collected by an inertial sensor on the head-mounted device, and calculating the pitch angle of the wearer based on the motion data.

Optionally, before sending the device control instruction to the to-be-controlled device, the method further comprises:

Acquiring a distance between a fourth positioning device on the head-mounted device and the to-be-controlled device, wherein connection lines between the first positioning device, the second positioning device, and the fourth positioning device are not collinear;

Determining whether the wearer's LOS direction is towards the to-be-controlled device based on the distance between the fourth positioning device and the to-be-controlled device, and the distance between the first positioning device or the second positioning device and the to-be-controlled device;

If yes, performing an operation of sending the device control instruction to the to-be-controlled device; or If not, the head-mounted device executing the device control instruction.

The present disclosure also provides a smart device control method applied to a smart device, the smart device control method comprising:

Receiving a device control instruction, and acquiring device distance information respectively between the first positioning device on a head-mounted device and the smart device, and between the second positioning device on the head-mounted device and the smart device, wherein the first positioning device and the second positioning device are symmetrically arranged on two sides of the head-mounted device;

Calculating a LOS deviation angle between a wearer of the head-mounted device and the smart device based on the device distance information, wherein the LOS deviation angle is an angle between the wearer's direct LOS and the relative direction of the device, and the relative direction of the device is a direction of a line connecting a midpoint of a connection between the first positioning device and the second positioning device to the smart device;

Determining whether the LOS deviation angle is less than a pre-set value:

If yes, executing an operation corresponding to the device control instruction; or If not, refraining from responding to the device control instruction.

Optionally, before executing the operation corresponding to the device control instruction, the method further comprises:

Acquiring a pitch angle of the wearer;

Judging whether the pitch angle of the wearer is within a pre-set pitch angle range:

If yes, proceed to the step of executing an operation corresponding to the device control instruction; or If not, refraining from responding to the device control instruction.

Optionally, before executing the operation corresponding to the device control instruction, the method further comprises:

Acquiring a distance between a fifth positioning device on the head-mounted device and the smart device, wherein connection lines between the first positioning device, the second positioning device, and the fifth positioning device are not collinear; and Determining whether the wearer's LOS direction is towards the smart device based on the distance between the fifth positioning device and the smart device, and the distance between the first positioning device or the second positioning device and the smart device:

If yes, proceed to the step of executing an operation corresponding to the device control instruction; or If not, refraining from responding to the device control instruction.

The present disclosure also provides a smart device control system applied to a head-mounted device comprising a first positioning device and a second positioning device that are symmetrically arranged, the smart device control system comprising:

A distance acquisition module configured to receive a device control instruction and acquire device distance information between the first positioning device and each smart device, and between the second positioning device and each smart device;

An angle calculation module configured to calculate a LOS deviation angle between a wearer of the head-mounted device and each of the smart devices based on the device distance information, wherein the LOS deviation angle is an angle between the wearer's direct LOS and a relative direction of the device, and the relative direction of the device is a direction of a line connecting a midpoint of a connection between the first positioning device and the second positioning device to the smart devices; and An instruction sending module is configured to determine a smart device with a LOS deviation angle less than a pre-set value as a to-be-controlled device, and send a device control instruction to the to-be-controlled device.

The present disclosure also provides a smart device control system applied to smart devices, and the smart device control system comprises:

An information receiving module, configured to receive a device control instruction and acquire device distance information respectively between the first positioning device on a head-mounted device and the smart device, and between the second positioning device on the head-mounted device and the smart device; wherein the first positioning device and the second positioning device are symmetrically arranged on two sides of the head-mounted device;

An angle determination module, configured to calculate a LOS deviation angle between the wearer of the head-mounted device and the smart device according to the device distance information, wherein the LOS deviation angle is an angle between the wearer's direct LOS and the relative direction of the device, and the relative direction of the device is a direction of a line connecting a midpoint of a connection between the first positioning device and the second positioning device to the smart device;

A decision-making module, configured to determine whether the LOS deviation angle is less than a pre-set value: if yes, executing an operation corresponding to the device control instruction; or if not, refraining from responding to the device control instruction.

The present disclosure also provides a storage medium on which a computer program is stored, which program, when executed, implement steps of the smart device control method as described above.

The present disclosure also provides an electronic device comprising a memory and a processor, wherein the memory stores therein a computer program, and the processor calls the computer program in the memory to implement steps of the smart device control method as described above.

The present disclosure provides a smart device control method applied to a head-mounted device, the head-mounted device comprising a first positioning device and a second positioning device that are symmetrically arranged, the smart device control method comprising: receiving a device control instruction, and acquiring device distance information respectively between the first positioning device and each smart device, and between the second positioning device and each smart device; calculating a LOS deviation angle between a wearer of the head-mounted device and each of the smart devices based on the device distance information, wherein the LOS deviation angle is an angle between the wearer's direct LOS and a relative direction of the device, and the relative direction of the device is a direction of a line connecting a midpoint of a connection between the first positioning device and the second positioning device to the smart devices; and determining a smart device with a LOS deviation angle less than a pre-set value as a to-be-controlled device, and sending a device control instruction to the to-be-controlled device.

A technical solution provided in the present disclosure is that the head-mounted device is symmetrically provided with a first positioning device and a second positioning device, and a direct LOS direction of the wearer lies in a plane perpendicular to the line connecting the first positioning device and the second positioning device. The LOS deviation angle between the wearer and each smart device can be determined based on information of device distance respectively between the first positioning device and each smart device, and between the second positioning device and each smart device. According to human natural behavior, people naturally face the object receiving the voice during conversation. The LOS deviation angle is used to describe the deviation degree of the smart device from the wearer's direct LOS direction. When the LOS deviation angle is less than a pre-set value, it indicates that the main observation object in the wearer's LOS is the smart device, and then the smart device is to be controlled. The present disclosure can determine the smart device that is to be controlled based on human behavior characteristics during conversation, and can achieve precise control of smart devices. The present disclosure also provides a smart device control system, a storage medium, and an electronic device, which have the above beneficial effects, and are not described in detail here.

BRIEF DESCRIPTION OF THE DRAWINGS

In order to more clearly illustrate the technical solutions in the embodiments of the present disclosure or the prior art, the drawings required for the description of the embodiments or the prior art will be briefly introduced below. It is obvious that the drawings described below are only a part of the drawings of the present disclosure. For those of ordinary skill in the art, other drawings can be acquired based on the provided drawings without creative labor.

DETAILED DESCRIPTION

Figure 1:
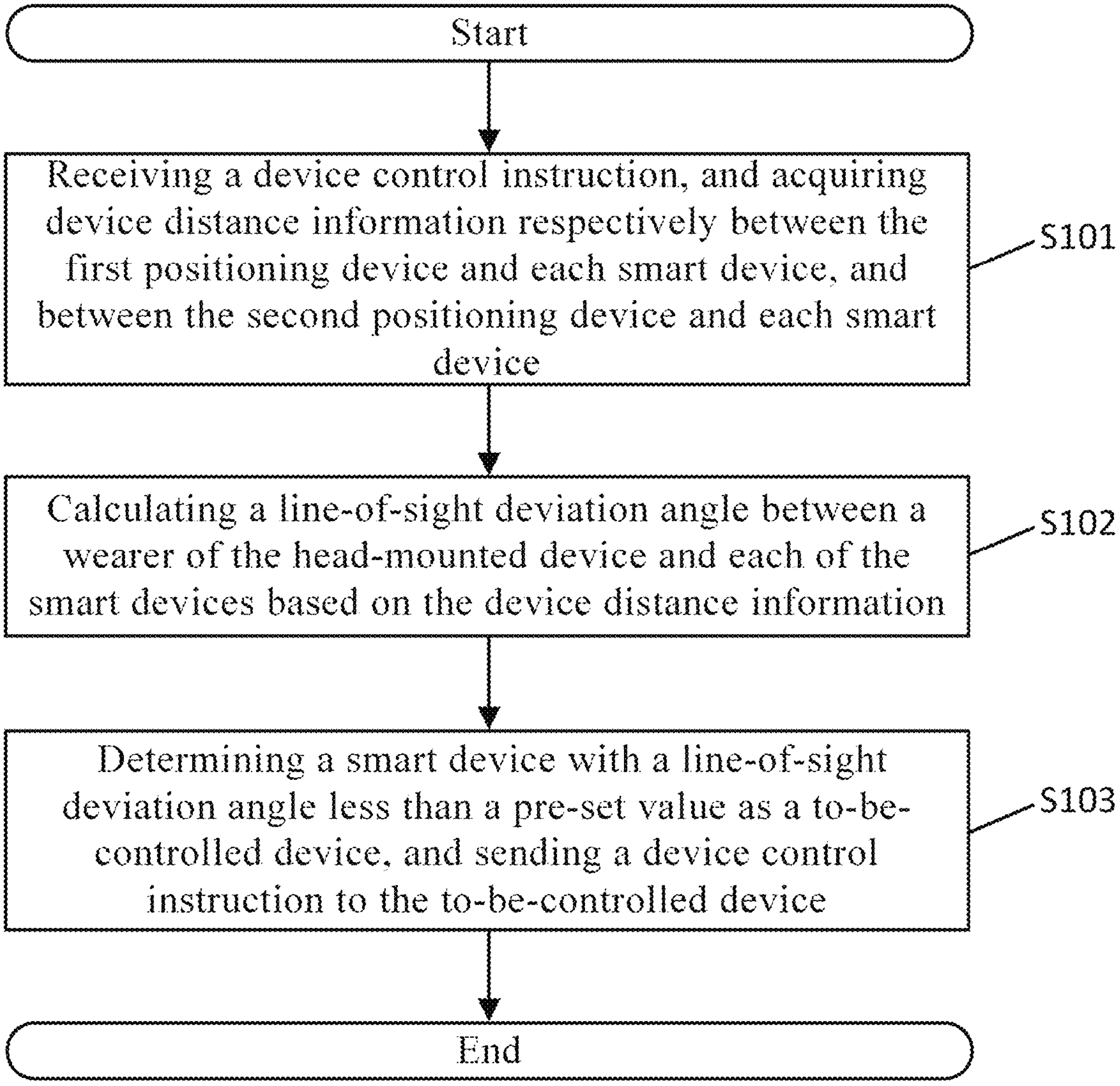
FIG. 1 is a flowchart of a smart device control method provided in an embodiment of the present disclosure.

The following will describe the technical solution in the embodiments of the present disclosure in conjunction with the accompanying drawings. Obviously, the described embodiments are only a part of the embodiments of the present disclosure, rather than all of them. Based on the embodiments in the present disclosure, all the other embodiments acquired by those of ordinary skill in the art without creative labor shall fall within the scope of protection of the present disclosure.

Please refer to FIG. 1 below, which is a flowchart of a smart device control method provided in an embodiment of the present disclosure.

The specific steps may include:

S101: Receiving a device control instruction, and acquiring device distance information respectively between the first positioning device and each smart device, and between the second positioning device and each smart device;

Here, in this embodiment, it is possible to be applied to AR (Augmented Reality) glasses, VR (Virtual Reality) helmets, headphones, and other head-mounted devices. The above-mentioned head-mounted devices include a first positioning device and a second positioning device that are symmetrically arranged. Specifically, when the user wears a head-mounted device, the device is symmetrical relative to the central axis of the head, and the first and second positioning devices are symmetrically located on two sides of the wearer's head. When the wearer's head moves, the positions of the first and second positioning devices in space also change. The above smart devices can include smart speakers, smart cameras, smart air conditioners, etc.

The device control instructions mentioned in this embodiment can be instructions sent by other control terminals (such as smartphones, tablets, etc.), instructions sent by user triggering knobs or buttons on the head-mounted device, and can also be user gesture instructions or voice instructions. The device control instructions can be a combination of the aforementioned types of instructions.

The first and second positioning devices mentioned above can be UWB (Ultra Wide Band) positioning labels, Bluetooth positioning devices, infrared signal transmitters, etc. A base station corresponding to the positioning device can be provided in the space where the wearer is located, to determine the position of the first and second positioning devices in space. UWB positioning technology has the characteristics of strong resistance to multipath, high positioning accuracy, high timestamp accuracy, strong electromagnetic compatibility, and high energy efficiency. There are three commonly used UWB ranging methods, including TOF (measuring the flight time of the signal between the base station and the label), TDOA (the time difference when the label arrives at different extremely narrow distances), and PDOA (measuring the azimuth relationship between the base station and the label through the arrival angle phase). In this embodiment, it is possible to pre-input the position of each smart device in space, and the distance information between the first and second positioning devices and each smart device can be acquired provided that the positions of the first and second positioning devices in space having been acquired. In this embodiment, it is possible to also install positioning devices in each smart device to determine the positions of each smart device in space. Furthermore, in this embodiment, it is possible to also install a positioning base station on each smart device to directly determine information of the device distance between the first and second positioning devices and each smart device. If the first positioning device, the second positioning device, and those positioning devices on the smart devices are positioning devices that can be independent of the base station, it is possible to directly determine information of the distances between the first positioning device and the second positioning device and each smart device based on signal transmission time difference between the positioning devices.

Figure 2:
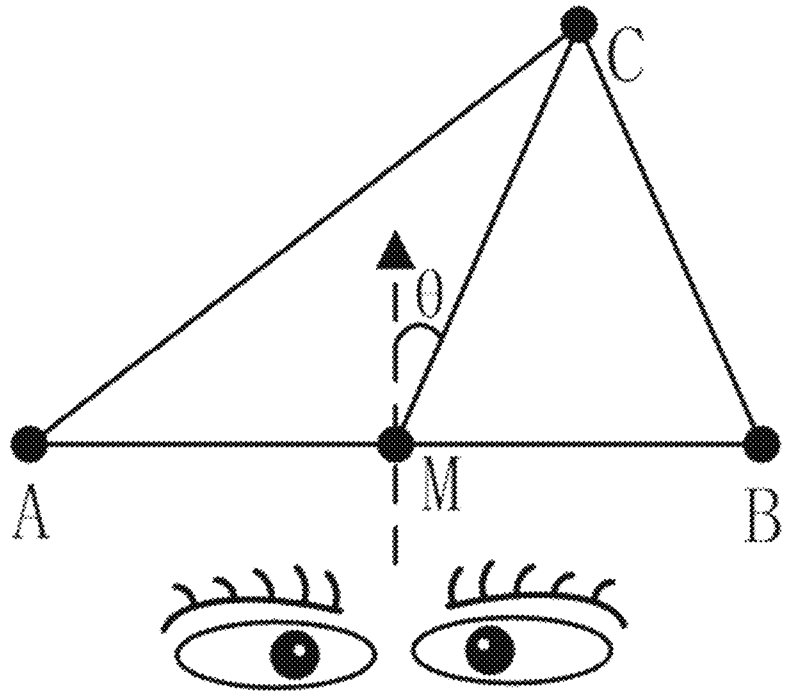
FIG. 2 is a schematic illustration of a method for determining the LOS deviation angle provided in an embodiment of the present disclosure.

S102: Calculating a LOS deviation angle between a wearer of the head-mounted device and each of the smart devices based on the device distance information;

Here, information of the device distance acquired in this embodiment includes the distances between the first positioning label and each smart device, as well as the distances between the second positioning label and each smart device. Based on the known distance between the first positioning label and the second positioning label, the LOS deviation angle can be determined. Please refer to FIG. 2, which is a schematic illustration of a method for determining the LOS deviation angle provided in an embodiment of the present disclosure, wherein A is the first positioning label, B is the second positioning label, C is the smart device, and M is the midpoint of the line connecting the first positioning device and the second positioning device, the LOS deviation angle θ is an angle between the wearer's direct LOS direction and the relative direction of the device, and the relative direction of the device is the direction of a line connecting a midpoint M of a connection between the first positioning device A and the second positioning device B to the smart device C; the wearer's direct LOS direction is a direction passing the midpoint M and perpendicular to AB.

S103: Determining a smart device with a LOS deviation angle less than a pre-set value as a to-be-controlled device, and sending a device control instruction to the to-be-controlled device.

Here, the LOS deviation angle is used to describe the degree of deviation of the smart device from wearer's direct LOS direction. The smaller the LOS deviation angle, the greater the probability that the wearer is facing the smart device directly. As people naturally face the object receiving the voice during conversation, smart devices with a LOS deviation angle of less than a pre-set value can be identified as the to-be-controlled device, and device control instructions can be sent to the to-be-controlled device.

Specifically, when the number of smart devices with a deviation angle of less than the pre-set value is 1, the smart device with a deviation angle less than the pre-set value can be directly set as the to-be-controlled device. When the number of smart devices with a deviation angle less than the pre-set value is more than 1, the smart device with the smallest deviation angle can be set as the to-be-controlled device. Furthermore, due to the different height settings of each smart device in the space, when the wearer turns their head towards the smart device, a certain pitch angle will occur, and the to-be-controlled device can be determined based on the pitch angle.

Provided that the to-be-controlled device having been determined, the head-mounted device can send the received device control instructions to the to-be-controlled device, so that the device can execute the corresponding operations of the device control instructions (such as playing music, shutting down, lighting up the screen, etc.). If there is no smart device with a deviation angle of less than the pre-set value from the LOS after receiving the device control instruction, it indicates that the device control instruction is an instruction to control the head-mounted device. At this time, the head-mounted device can execute the operation corresponding to the device control instruction.

In the technical solution provided in this embodiment, the head wearing device is symmetrically provided with a first positioning device and a second positioning device. A direct LOS direction of the wearer lies in a plane perpendicular to the line connecting the first positioning device and the second positioning device. The LOS deviation angle between the wearer and each smart device can be determined based on information of the distance respectively between the first positioning device and each smart device, and between the second positioning device and each smart device. According to human natural behavior, people naturally face the object receiving the voice during conversation. The LOS deviation angle is used to describe the deviation degree of the smart device from the wearer's direct LOS direction. When the LOS deviation angle is less than a pre-set value, it indicates that the main observation object in the wearer's LOS is the smart device, and then controls the smart device. In this embodiment, it is possible to determine the smart devices that need to be controlled based on the behavioral characteristics of human conversation, and can achieve precise control of the smart devices.

Figure 3:
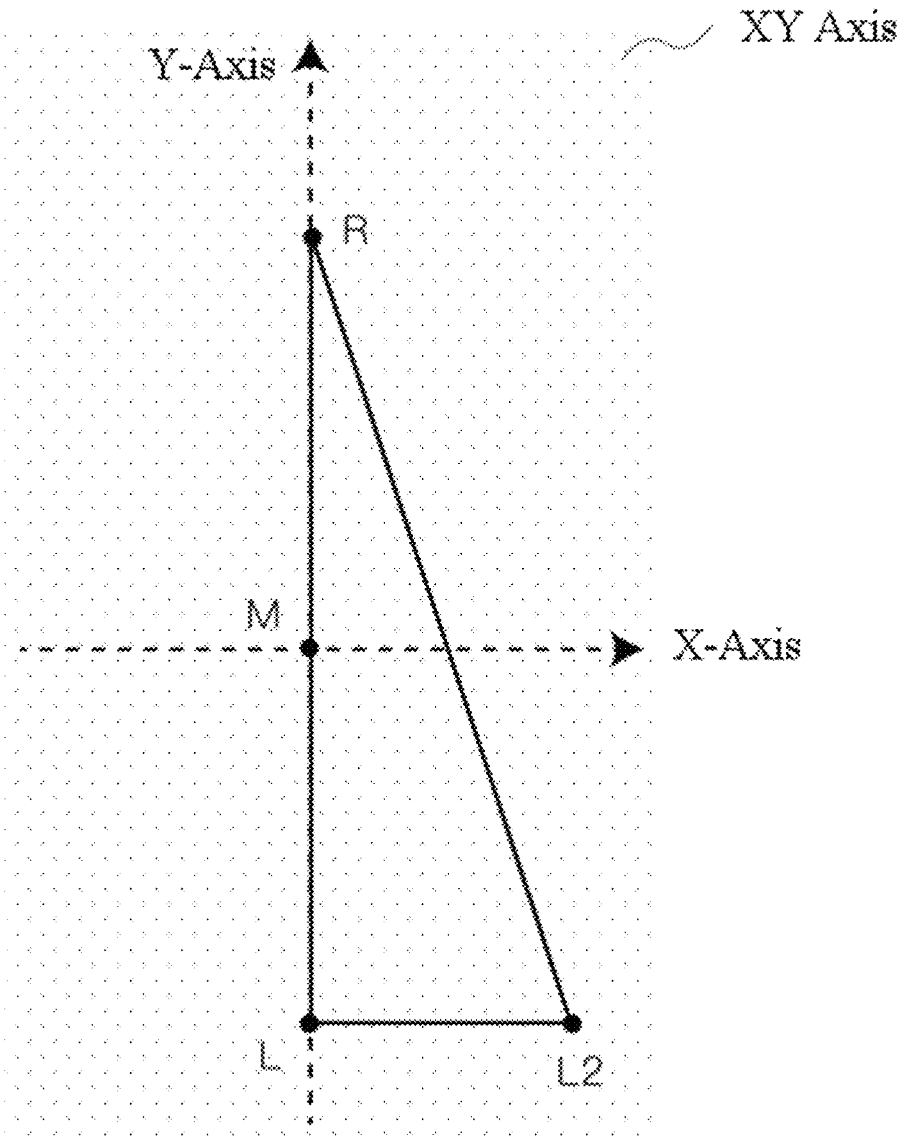
FIG. 3 is a schematic illustration of a method for determining a wearer's LOS plane provided in an embodiment of the present disclosure.
Figure 4:
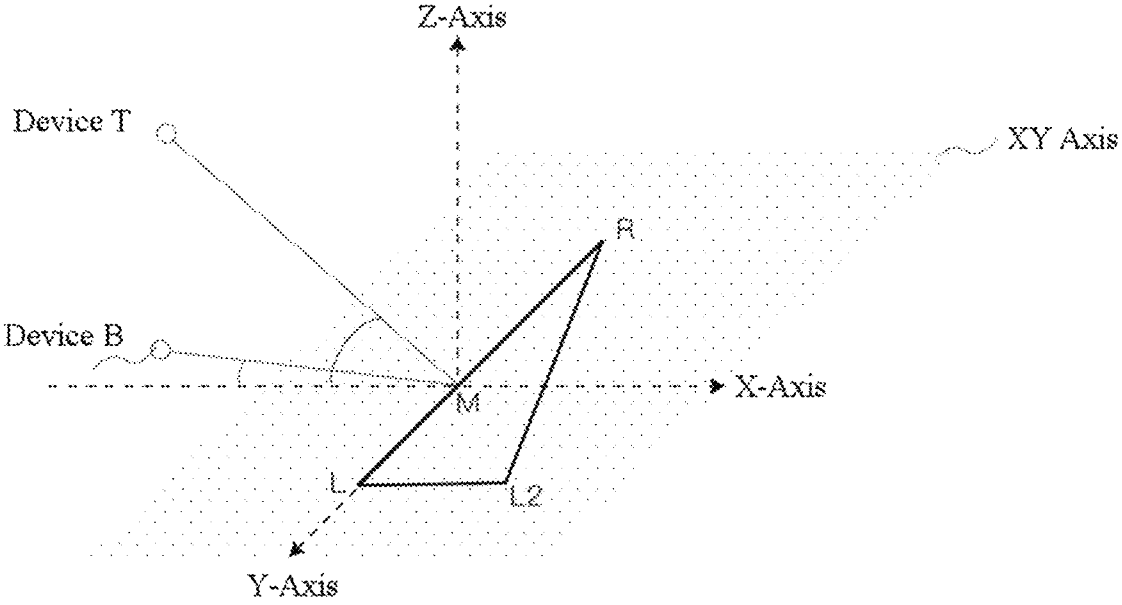
FIG. 4 is a schematic illustration of a pitch angle determination method provided in an embodiment of the present disclosure.

Please refer to FIG. 3, which is a schematic illustration of a method for determining the wearer's LOS plane provided in an embodiment of the present disclosure. In FIG. 3, L represents the first positioning device, R represents the second positioning device, L2 represents the third positioning device, M is the midpoint of the line segment LR, and the plane in which L, R, and L2 are located is the wearer's LOS plane. Please refer to FIG. 4, which is a schematic illustration of a pitch angle determination method provided in an embodiment of the present disclosure. The angle between the plane LRL2 and the horizontal plane is the pitch angle. Both smart devices T and B can have their corresponding pre-set pitch angle range. When the wearer's pitch angle falls within the pre-set pitch angle range corresponding to a smart device, it indicates that the wearer's control object is the smart device. As shown in FIG. 4, the three positioning sensors of the temple of glasses are located on the XY plane, and the wearer's direct LOS direction is parallel to the XY plane. The angle formed between the positioning sensors of different smart products and the midpoint of the plane M (R and L) is used as the LOS deviation angle. If the LOS deviation angle of smart device B is less than 5°, it is determined that smart device B is the to-be-controlled device. If the LOS deviation angle of smart device T is greater than 5°, it is determined that smart device T is not the to-be-controlled device.

As a further introduction to the embodiment corresponding to FIG. 1, in this embodiment, it is possible to accurately determine the to-be-controlled device by setting the smart device with the LOS deviation angle less than the pre-set value as a candidate device. If there are more than one candidate device, acquire the pitch angle of the wearer, and determine the to-be-controlled device from the candidate devices based on the wearer's pitch angle: wherein the wearer's pitch angle is within the pre-set pitch angle range corresponding to the to-be-controlled device. Each candidate device can have its corresponding pre-set pitch angle range, which is used to describe the pitch angle states that often occur when users control the device. For example, if the user needs to raise its head to control the smart air conditioning, the pre-set pitch angle range of the smart air conditioning is 60°~80° when looking up, and if the user needs to lower its head to control the sweeping robot, the pre-set pitch angle range of the sweeping robot is 20°~30° when looking down. The above method is based on the user's pitch angle and the pre-set pitch angle range of the candidate device to filter and determine the to-be-controlled device that needs to execute the device control instruction.

For example, if the LOS deviation angle between the wearer and the smart air conditioner and that between the wearer and the smart speaker is less than the pre-set value of 5°, the to-be-controlled device can be determined based on the user's pitch angle.

If the pre-set pitch angle range corresponding to the smart air conditioner is 60°~80° when looking up, the pitch angle of the smart speaker is 50°~70° when looking up, and the wearer's pitch angle is 75° when looking up, it indicates that the to-be-controlled device is the smart air conditioner. When the wearer's pitch angle is 55° when looking up, it indicates that the to-be-controlled device is a smart speaker.

Furthermore, if there are at least two candidate devices corresponding to pre-set pitch angle ranges that contain the wearer's pitch angle, the candidate device with the smallest deviation angle from the LOS among all eligible candidate devices will be set as the to-be-controlled device. The above pre-set conditions are that the pre-set pitch angle range corresponding to the candidate device includes the wearer's pitch angle.

For example, if the LOS deviation angle between the wearer and the smart air conditioner is 3°, and the LOS deviation angle between the wearer and the smart speaker is 2°, the LOS deviation angle corresponding to both the smart air conditioner and the smart speaker are less than the pre-set value of 5°. At this point, the to-be-controlled device can be determined based on the user's pitch angle. If the pre-set pitch angle range corresponding to the smart air conditioner is 60°~80° when looking up, the pitch angle of the smart speaker is 50°~70° when looking up, when the wearer's pitch angle is 65° when looking up, the smart speaker has the smallest LOS deviation angle and is set as the to-be-controlled device.

As a feasible implementation, in this embodiment, it is possible to acquire the pitch angle of the wearer by acquiring the spatial position coordinates of the first positioning device, the second positioning device, and the third positioning device on the head-mounted device; wherein, the connection lines between the first positioning device, the second positioning device, and the third positioning device are not colinear; and determine the pitch angle of the wearer based on the spatial position coordinates of the first positioning device, the second positioning device, and the third positioning device.

As another feasible implementation, in this embodiment, it is also possible to acquire the wearer's pitch angle by acquiring motion data collected by the inertial sensor on the head-mounted device, and calculating the wearer's pitch angle based on the motion data. The above inertial sensors can include accelerometers, gyroscopes, etc.

As a feasible implementation, before sending the device control instruction to the to-be-controlled device, there may also be an operation to determine whether the wearer is right facing the control device. Specifically, the process is as follows: acquiring the distance between a fourth positioning device on the head-mounted device and the to-be-controlled device; wherein, the connection lines between the first positioning device, the second positioning device, and the fourth positioning device are not colinear; and determining whether the wearer's LOS direction is towards the to-be-controlled device based on the distance between the fourth positioning device and the to-be-controlled device, as well as the distance between the first positioning device or the second positioning device and the to-be-controlled device: if so, execute the operation of sending the device control instruction to the to-be-controlled device; if not, the head-mounted device executes the device control instruction.

Due to the fact that the first positioning device, second positioning device, and fourth positioning device are not co-linear, the position of the head-mounted device in space can be determined based on the distance between the first positioning device, the second positioning device, and the fourth positioning device and the to-be-controlled device, thereby determining whether the wearer's LOS direction is towards the to-be-controlled device. The above method can further improve the control accuracy of head-mounted devices over smart devices. As a feasible implementation, the fourth positioning device and the third positioning device mentioned above can be the same positioning device. By providing the fourth positioning device, it is possible to determine whether the wearer is facing the smart device and also determine the wearer's pitch angle.

The above implementation example introduces the process of determining the control object through a head-mounted device and sending device control instructions to the selected smart device. As a feasible implementation, head-mounted devices can send device control instructions to all smart devices indiscriminately. Smart devices determine whether they are the control object of device control instructions based on the distance between themselves and the positioning device on the head-mounted device. The specific process is as follows:

Step 1: receiving a device control instruction, and acquiring device distance information respectively between the first positioning device on a head-mounted device and the smart device, and between the second positioning device on the head-mounted device and the smart device, wherein, in this embodiment, it is possible to be applied to smart devices such as smart speakers, smart cameras, smart air conditioners, etc. The smart devices can be equipped with positioning devices, and the first and second positioning devices can be symmetrically arranged on two sides of the head-mounted device. The positioning device of the smart device, the first positioning device, and second positioning device can all be UWB positioning labels.

Step 2: Calculate the LOS deviation angle between the wearer of the head-mounted device and the smart device based on the distance information of the device;

Wherein, the LOS deviation angle is an angle between the wearer's direct LOS direction and the relative direction of the device, and the relative direction of the device is a direction of a line connecting a midpoint of a connection between the first positioning device and the second positioning device to the smart device.

Step 3: Determine whether the LOS deviation angle is less than the pre-set value; if yes, execute the operation corresponding to the device control instruction; if not, refrain from responding to the device control instruction.

In the technical solution provided in this embodiment, the head wearing device is symmetrically provided with a first positioning device and a second positioning device. A direct LOS direction of the wearer lies in a plane perpendicular to the line connecting the first positioning device and the second positioning device. The LOS deviation angle between the wearer and the smart device can be determined based on information of the distance between the smart device and the first and second positioning devices, respectively. According to human natural behavior, people naturally face the object receiving the voice during conversation. The LOS deviation angle is used to describe the deviation degree of the smart device from the wearer's direct LOS direction. When the LOS deviation angle is less than a pre-set value, it indicates that the main observation object in the wearer's LOS is the smart device, and then controls the smart device. In this embodiment, the smart device can determine whether itself is a controlled object based on the behavioral characteristics of human conversation, and can achieve precise response of the smart device to device control instructions.

As a feasible implementation, the pitch angle of the wearer can also be acquired before executing the operation corresponding to the device control instruction; to determine whether the wearer's pitch angle is within the pre-set pitch angle range: if yes, proceed to the step of executing the operation corresponding to the device control instruction; if not, refrain from responding to the device control instruction.

As a feasible implementation, before executing the operation corresponding to the device control instruction, the distance between the fifth positioning device on the head-mounted device and the smart device can also be acquired; wherein, the connection lines between the first positioning device, the second positioning device, and the fifth positioning device are not colinear. Determine whether the wearer's LOS direction is towards the smart device based on the distance between the fifth positioning device and the smart device, as well as the distance between the first positioning device or the second positioning device and the smart device: if so, proceed to the step of executing the operation corresponding to the device control instruction; if not, refrain from responding to the device control instruction. As a feasible implementation, the fifth positioning device can be the same as the fourth and third positioning devices mentioned above.

The following illustrates the process described in the above embodiments through practical applications.

Figure 5:
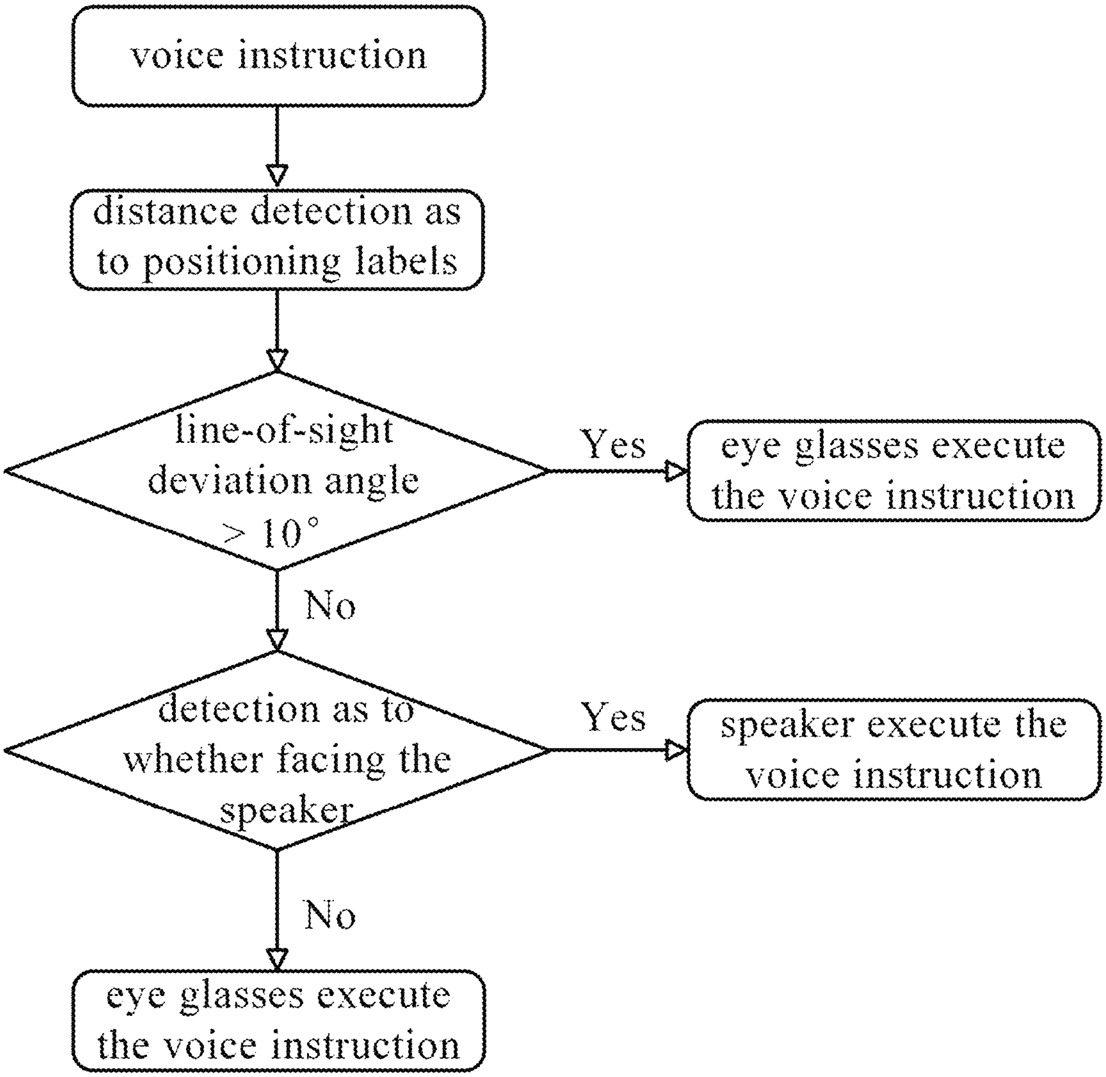
FIG. 5 is a flowchart of a method for identifying the interacted device using the LOS deviation value provided in an embodiment of the present disclosure.

Based on human natural behavior, the speaker will naturally face the object receiving the voice during conversation. Based on the natural movement of the head, this embodiment provides a solution to recognize the interacting smart device by using smart glasses to measure the LOS deviation value. The smart glasses in this solution can be replaced with head-mount devices such as smart helmets, TWS earphones, and headphones. Please refer to FIG. 5, which is a flowchart of a method for identifying the interacted device using the LOS deviation value provided in an embodiment of the present disclosure. After receiving a voice instruction, distance detection is performed using a positioning label to determine whether the deviation angle exceeds 10 degrees. If it exceeds 10 degrees, control the glasses to execute voice instructions; if it does not exceed 10 degrees, determine whether the user is facing the speaker. If facing the speaker, control the speaker to execute voice instructions; if facing away from the speaker, control the glasses to execute voice instructions.

Figure 6:
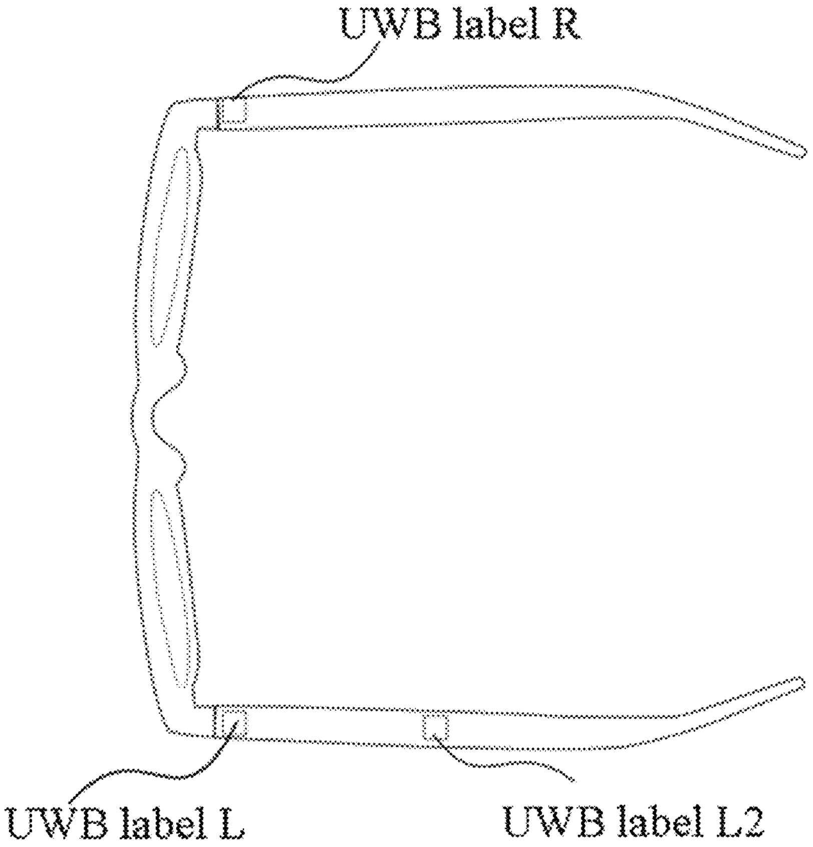
FIG. 6 is a schematic illustration of setting locations of UWB positioning labels provided in the embodiments of the present disclosure.

This technical solution utilizes the high-precision ranging feature of UWB and measures the deviation angle between the LOS following the head movement and the target device through smart glasses (or other devices with left-right symmetry properties). The natural response of the user is used as a reliable basis for determining the target device being interacted with. The content of this technical solution is as follows:

Please refer to FIG. 6, which is a schematic illustration of the UWB positioning label setting position provided in an embodiment of the present disclosure. As shown in FIG. 6, this embodiment provides three UWB positioning labels on the temple of the smart glasses: the left temple is provided with UWB positioning labels L and L2, and the right temple is provided with UWB positioning label R. The R and L are in a symmetrical state, with a certain distance between L and L2. The L is located on the proximal frame side and L2 is located on the distal frame side. The R and L are used to measure the degree of LOS deviation from the target device. L2 is used to measure forward or backward facing target devices. The arrangement of the three UWB positioning labels in this embodiment is not fixed, and there can also be two labels on the right temple and one label on the left temple. However, the pair of positioning labels on the left and right temples must be in a symmetrical state, and of course, the L2 label can also be located on the frame of the glasses.

Figure 7:
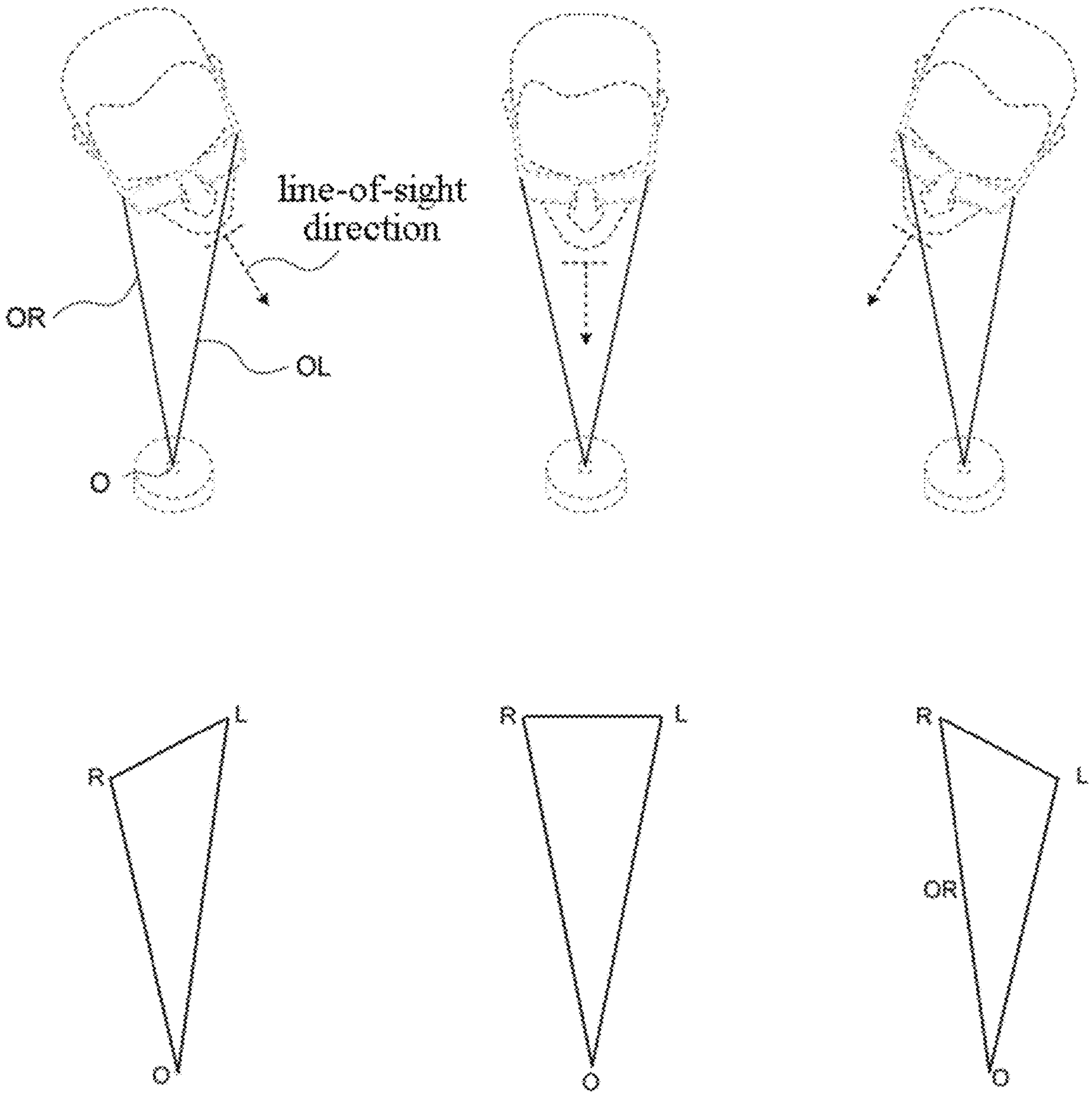
FIG. 7 is a schematic illustration of the positional relationship between the wearer's LOS direction and the smart device provided in an embodiment of the present disclosure.

Please refer to FIG. 7, which is a schematic illustration of the relationship between the wearer's LOS direction and the position of the smart device provided in an embodiment of the present disclosure. As shown in FIG. 7, when the user wears smart glasses and enters an environment with other smart devices, taking the speaker as an example, the speaker has a UWB positioning label O. The distance between O and R is denoted as OR, the distance between O and L is denoted as OL, and the distance between O and L2 is denoted as OL2. The UWB ranging method can be achieved through the above method. In addition to the UWB ranging method, other high-precision ranging techniques can also be used to determine the distance between each positioning device on the smart glasses and the smart device.

Figure 8:
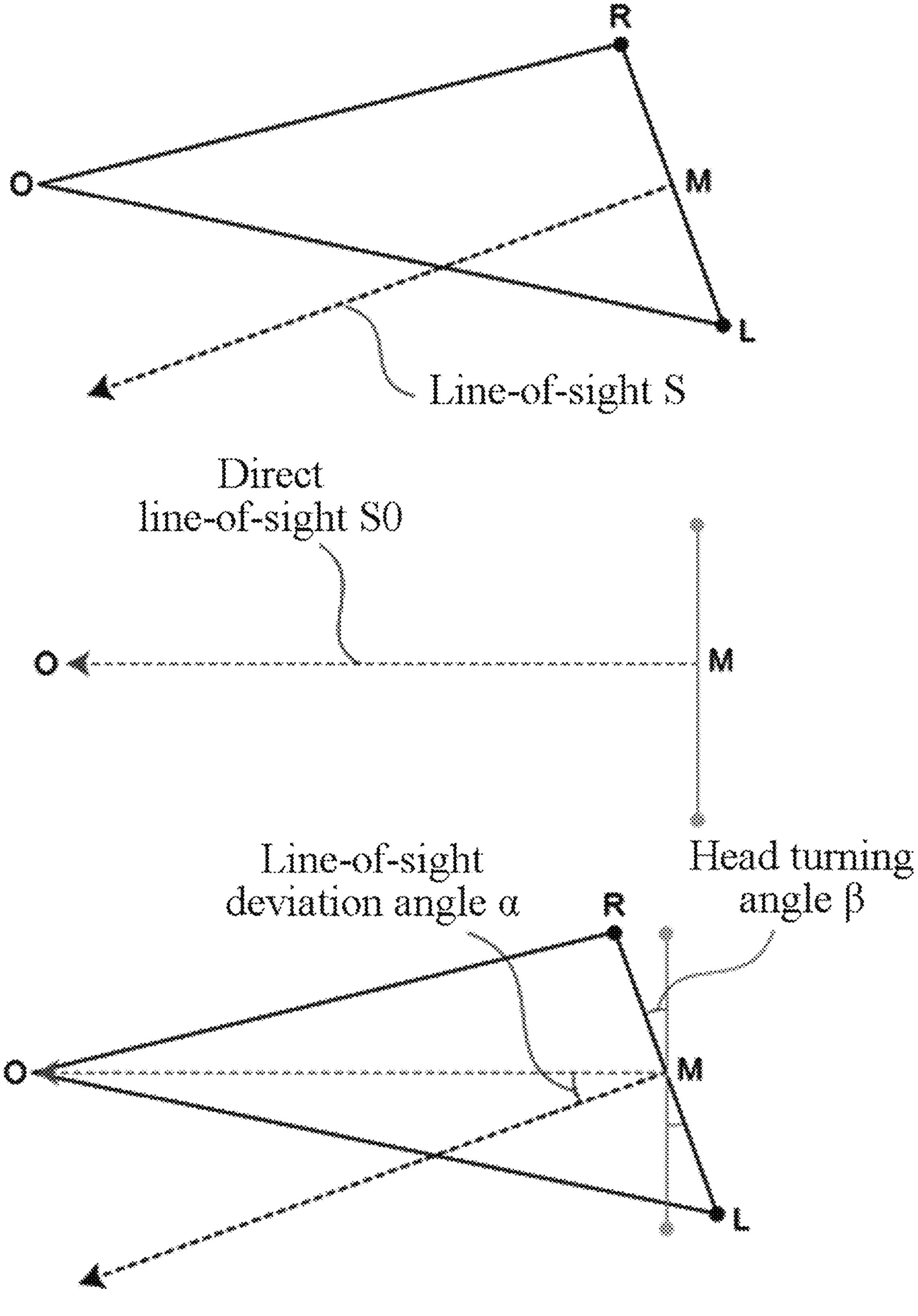
FIG. 8 is a schematic illustration of the principle of judging a direct LOS on a speaker provided in an embodiment of the present disclosure.
Figure 9:
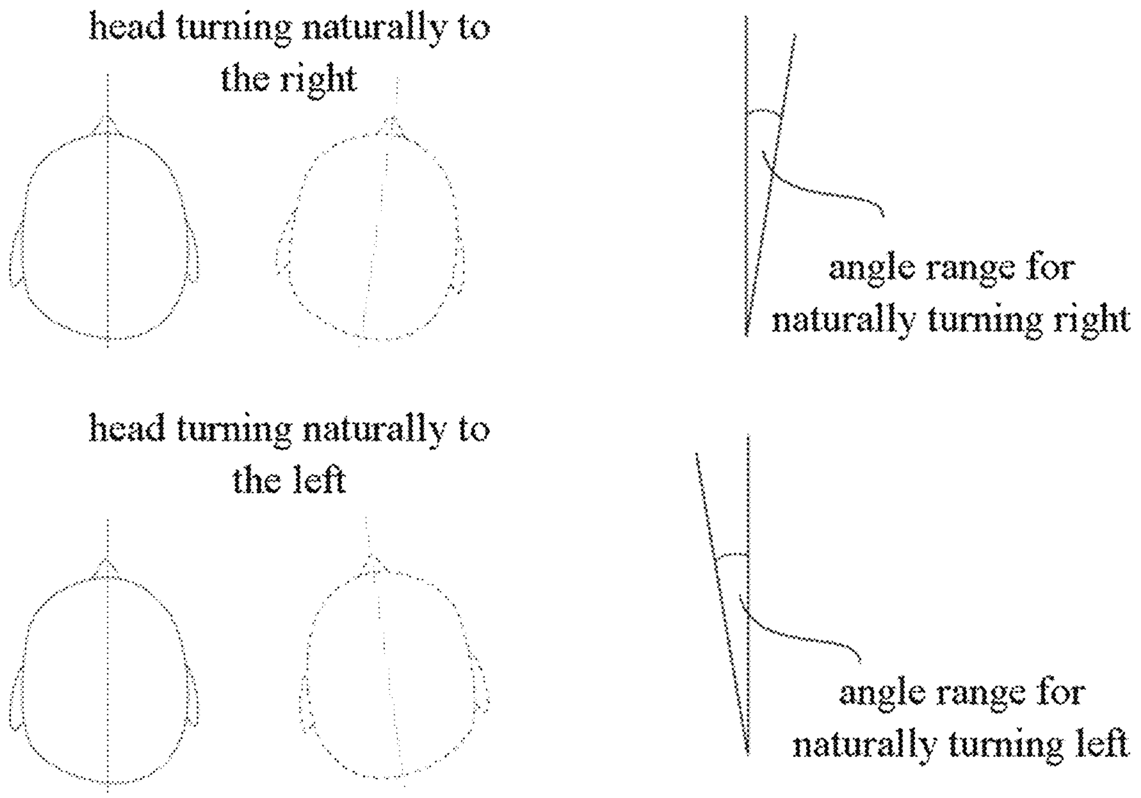
FIG. 9 is a schematic illustration of the wearer's LOS rotation provided in an embodiment of the present disclosure.

Please refer to FIGS. 8 and 9. FIG. 8 is a schematic illustration of judging a direct LOS direction on a speaker provided in an embodiment of the present disclosure, and FIG. 9 is a schematic illustration of a wearer's LOS rotation provided in an embodiment of the present disclosure. As shown in FIGS. 8 and 9, when the user issues a voice instruction, the smart device (taking the speaker as an example) receives the voice and uses positioning technology to detect the distance between each positioning label. According to the schematic illustration of the distance relationship between the temple positioning label and the speaker positioning label, OR corresponds to the distance between the right temple positioning label and the speaker positioning label, OL corresponds to the distance between the left temple positioning label and the speaker positioning label, RL is the distance between the left and right temple positioning labels, and the distances between different positioning labels are acquired through ranging technologies. M is the midpoint of the RL line, and the LOS S is perpendicular to the RL line and passes through M.

According to the standard direct LOS direction diagram, taking the natural head rotation of users wearing glasses as an example, when the user shows a standard direct LOS direction relationship with the speaker, the direct LOS direction S0 is the OM line.

Calculate the deviation angle $\alpha$ between the standard direct LOS and the user's actual LOS.

According to the trigonometric function, calculate the degree of $\angle$OMR by cosine value.

$$\text{Cos } \angle OMR = (OM2 + RM2 - OR2)/(2 * OM * MR)$$

LOS deviation angle $\alpha$=Head Turning angle $\beta$=90°−$\angle$OMR

According to the natural movement laws of human, there is a certain LOS deviation when facing a target object. The floating range of natural left and right head turns can be set to 10°. When $\alpha$>10°, it is judged that the user is not looking directly at the target object. When $\alpha \leq 10°$, it is determined that the user is directly facing the target object. By using the above method, the deviation caused by the slight rotation of the head when facing the target object in a non-standard manner can be incorporated within the tolerance range of the judgment.

Figure 10:
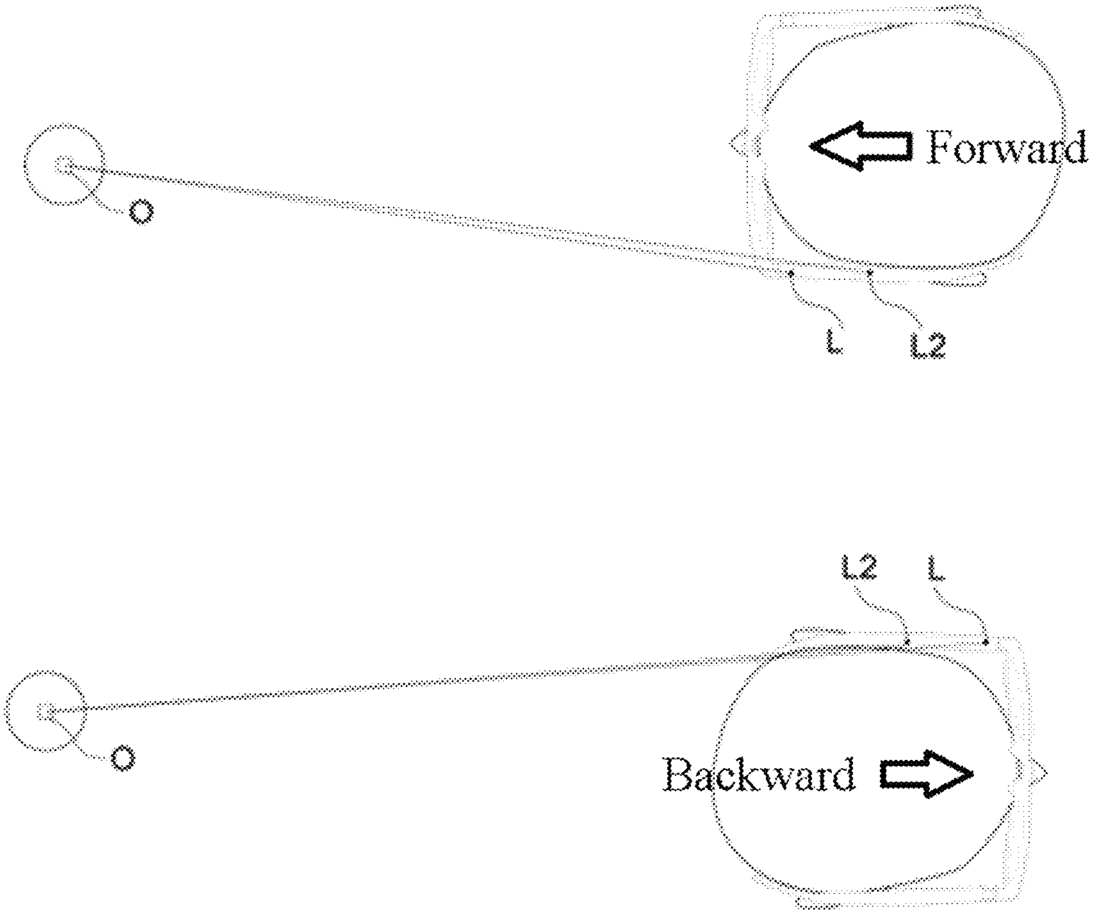
FIG. 10 is a schematic illustration of the principle of detection of the wearer's facing direction provided in an embodiment of the present disclosure.
Figure 11:
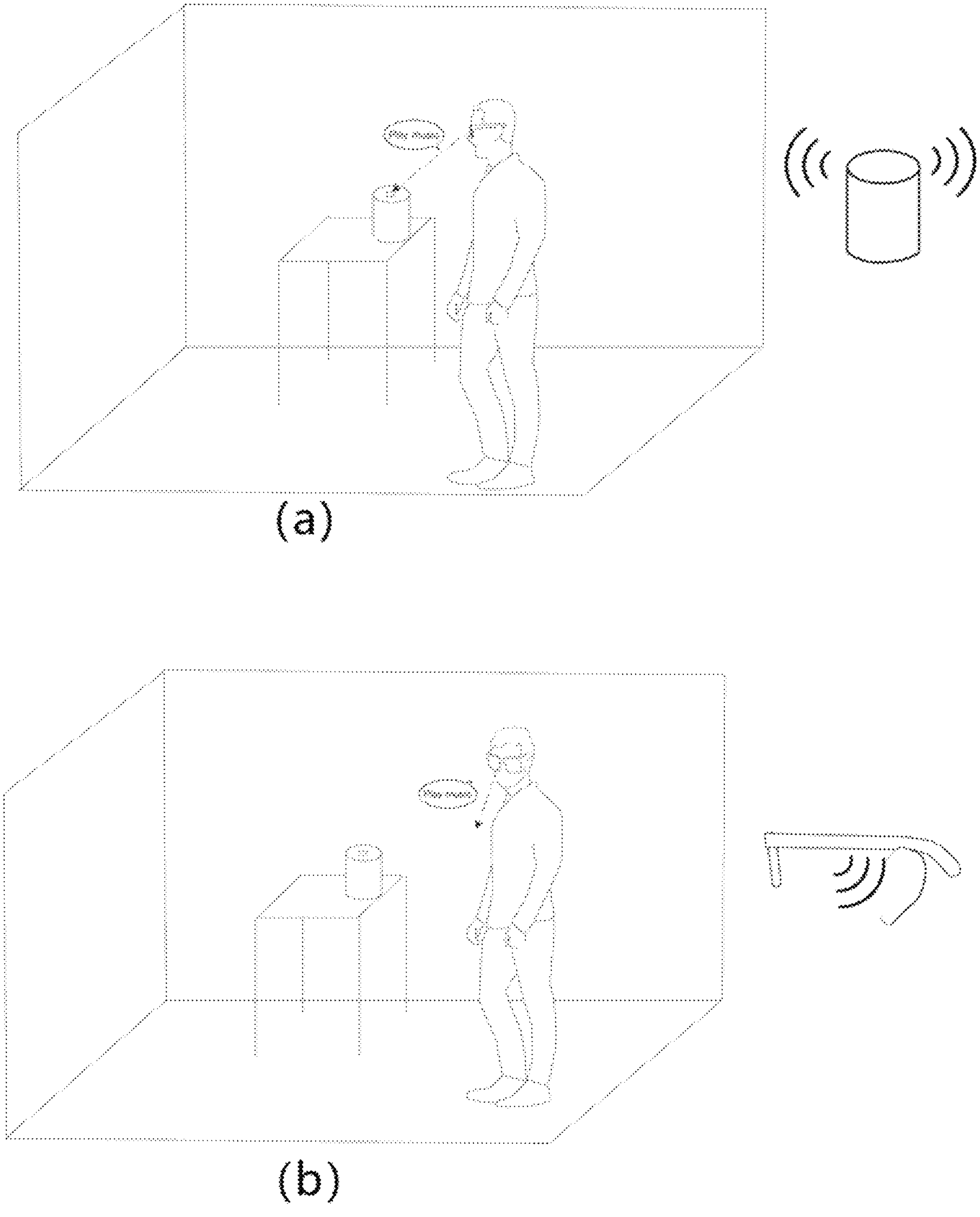
FIG. 11 is a scenario illustration of the detection of the wearer's facing direction provided in an embodiment of the present disclosure.

Please refer to FIGS. 10 and 11. FIG. 10 is a schematic illustration of the principle of detection of the wearer's facing direction provided in an embodiment of the present disclosure, and FIG. 11 is a scenario illustration of the detection of the wearer's facing direction provided in an embodiment of the present disclosure. As shown in FIG. 10, distance detection of OL2 is performed when the user is determined to be facing the target object. When the user is facing the speaker in the forward direction, OL<OL2, and the speaker executes voice instructions. When the user is facing away from the speaker, OL>OL2, the smart glasses execute voice instructions. As shown in FIG. 11, when the user inputs a "Play music" instruction towards the speaker, the speaker plays music; when the user does not input a "Play music" instruction towards the speaker, the speaker does not respond to the Play music instruction, and at this time the smart glasses play music.

Figure 12:
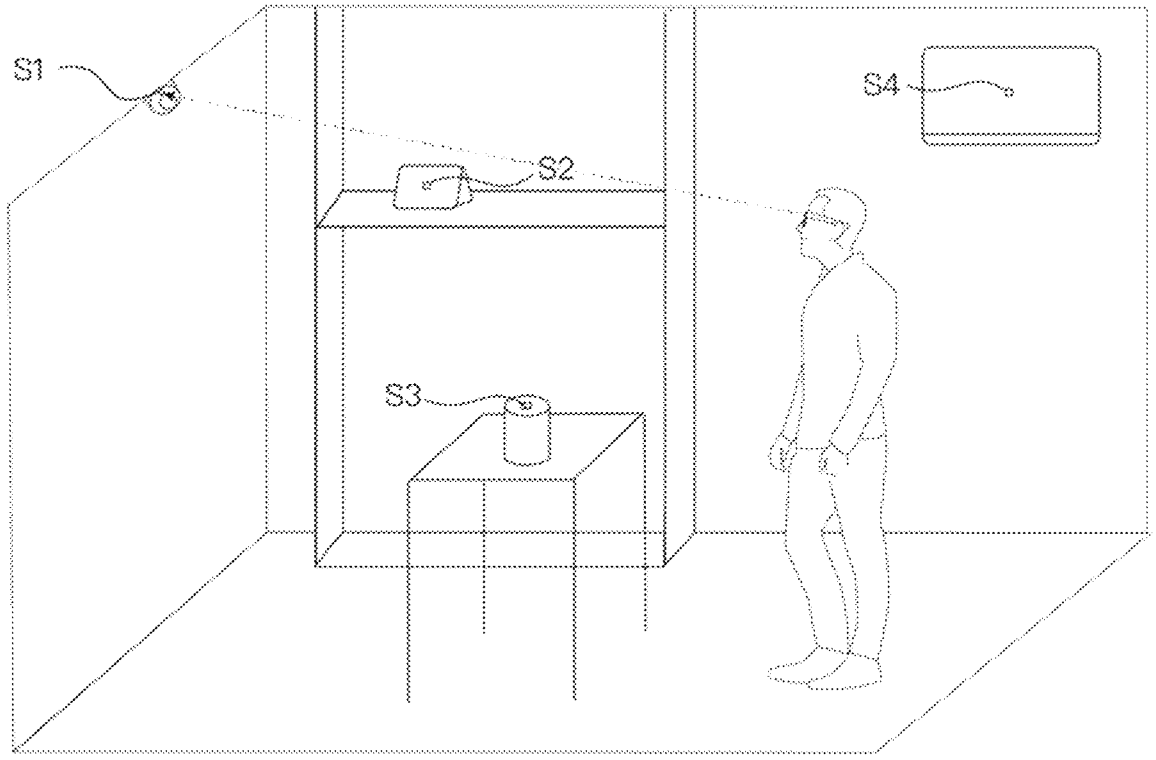
FIG. 12 is a schematic illustration of a scenario in which a user accesses multiple smart devices provided in an embodiment of the present disclosure.

Please refer to FIG. 12, which is a schematic illustration of a scenario where a user accesses a plurality of smart devices provided in an embodiment of the present disclosure. In FIG. 12, S1 is a smart camera, S2 is a smart screen, S3 is a smart speaker, and S4 is a smart air conditioner. Each smart device has a positioning label that can acquire the distance therefrom to the positioning labels on the left and right legs of the glasses. When the user wishes to turn on S1, it naturally lifts its head and point its LOS towards the position where S1 is located. When the user sends an "Turn on" voice instruction, all smart devices and the left and right temples perform LOS angle detection, using the same method as the above technical solution. The difference in distance between the device and the left and right temples is used as the basis for determining whether it is the target device. The LOS deviation value corresponding to S1 meets the judgment criteria of the target interactive device, and S1 responds to the user's voice instructions, turning on the corresponding smart camera. None of S2, S3, and S4 meets the judgment criteria of the target interactive device, and they do not respond to the user's voice instructions.

An embodiment of the present disclosure also provides a smart device control system applied to a head-mounted device, wherein the head-mounted device comprises a symmetrically arranged first positioning device and a second positioning device, and the smart device control system comprises:

A distance acquisition module configured to receive a device control instruction and acquire device distance information between the first positioning device and each smart device, and between the second positioning device and each smart device;

An angle calculation module configured to calculate a LOS deviation angle between a wearer of the head-mounted device and each of the smart devices based on the device distance information, wherein the LOS deviation angle is an angle between the wearer's direct LOS and a relative direction of the device, and the relative direction of the device is a direction of a line connecting a midpoint of a connection between the first positioning device and the second positioning device to the smart devices; and An instruction sending module is configured to determine a smart device with a LOS deviation angle less than a pre-set value as a to-be-controlled device, and send a device control instruction to the to-be-controlled device.

In the technical solution provided in this embodiment, the head wearing device is symmetrically provided with a first positioning device and a second positioning device, and a direct LOS direction of the wearer lies in a plane perpendicular to the line connecting the first positioning device and the second positioning device. The LOS deviation angle between the wearer and each smart device can be determined based on information of distance respectively between the first positioning device and each smart device, and between the second positioning device and each smart device. According to human natural behavior, people naturally face the object receiving the voice during conversation. The LOS deviation angle is used to describe the deviation degree of the smart device from the wearer's direct LOS direction. When the LOS deviation angle is less than a pre-set value, it indicates that the main observation object in the wearer's LOS is the smart device, and then controls the smart device. In this embodiment, it is possible to determine the smart device that need to be controlled based on the behavioral characteristics of human conversation, and can achieve precise control of the smart devices.

Furthermore, the instruction sending module includes:

A candidate device determination unit, configured for setting the smart device with a LOS deviation angle less than the pre-set value as a candidate device;

A pitch angle determination unit, configured for: if there are more than one candidate device, acquiring a pitch angle of the wearer;

A to-be-controlled device determination unit, configured for determining the to-be-controlled device from candidate devices according to the pitch angle of the wearer, wherein the pitch angle of the wearer is within a pre-set pitch angle range corresponding to the to-be-controlled device.

Furthermore, the pitch angle determination unit is configured for acquiring spatial position coordinates of the first positioning device, the second positioning device, and a third positioning device on the head-mounted device, wherein connection lines between the first positioning device, the second positioning device, and the third positioning device are not collinear; and configured for determining the pitch angle of the wearer according to the spatial position coordinates of the first positioning device, the second positioning device, and the third positioning device.

Furthermore, the pitch angle determination unit is configured for acquiring motion data collected by an inertial sensor on the head-mounted device, and calculating the pitch angle of the wearer based on the motion data.

Furthermore, the system also includes:

Facing direction determination module, configured for: acquiring a distance between a fourth positioning device on the head-mounted device and the to-be-controlled device, wherein connection lines between the first positioning device, the second positioning device, and the fourth positioning device are not collinear;

Determining whether the wearer's LOS direction is towards the to-be-controlled device based on the distance between the fourth positioning device and the to-be-controlled device, and the distance between the first positioning device or the second positioning device and the to-be-controlled device; if yes, performing an operation of sending the device control instruction to the to-be-controlled device; or if not, the head-mounted device executing the device control instruction.

An embodiment of the present disclosure also provides a smart device control system applied to a smart device, the smart device control system comprising:

An information receiving module, configured for receiving a device control instruction, and acquiring device distance information respectively between the first positioning device on a head-mounted device and the smart device, and between the second positioning device on the head-mounted device and the smart device, wherein the first positioning device and the second positioning device are symmetrically arranged on two sides of the head-mounted device;

An angle determination module, configured for calculating a LOS deviation angle between a wearer of the head-mounted device and the smart device based on the device distance information, wherein the LOS deviation angle is an angle between the wearer's direct LOS direction and the relative direction of the device, and the relative direction of the device is a direction of a line connecting a midpoint of a connection between the first positioning device and the second positioning device to the smart device; and A decision-making module, configured for determining whether the LOS deviation angle is less than a pre-set value: if yes, executing an operation corresponding to the device control instruction; if not, refraining from responding to the device control instruction.

In the technical solution provided in this embodiment, the head wearing device is symmetrically provided with a first positioning device and a second positioning device. A direct LOS direction of the wearer lies in a plane perpendicular to the line connecting the first positioning device and the second positioning device. The LOS deviation angle between the wearer and the smart device can be determined based on information of the distance respectively between the first positioning device and each smart device, and between the second positioning device and each smart device. According to human natural behavior, people naturally face the object receiving the voice during conversation. The LOS deviation angle is used to describe the deviation degree of the smart device from the wearer's direct LOS direction. When the LOS deviation angle is less than the pre-set value, it indicates that the main observation object in the wearer's LOS is the smart device, and then controls the smart device. In this embodiment, the smart device can determine whether it is a controlled object based on the behavioral characteristics of human conversation, and can achieve precise response of the smart device to device control instructions.

Furthermore, the system also includes:

A pitch angle judgment module, configured for: before executing the operation corresponding to the device control instruction, acquiring a pitch angle of the wearer; judging whether the pitch angle of the wearer is within a pre-set pitch angle range: if yes, proceed to the step of executing an operation corresponding to the device control instruction; if not, refraining from responding to the device control instruction.

Furthermore, the system also includes:

A pitch angle decision-making module, configured for: before executing the operation corresponding to the device control instruction, acquiring a distance between a fifth positioning device on the head-mounted device and the smart device, wherein connection lines between the first positioning device, the second positioning device, and the fifth positioning device are not collinear; and determining whether the wearer's LOS direction is towards the smart device based on the distance between the fifth positioning device and the smart device, and the distance between the first positioning device or the second positioning device and the smart device: if yes, proceed to the step of executing an operation corresponding to the device control instruction; or if not, refraining from responding to the device control instruction.

Due to the correspondence between the implementation examples of the system part and the implementation examples of the method part, please refer to the description of the implementation examples in the method part for the implementation examples of the system part, which will not be elaborated here.

The present disclosure also provides a storage medium on which a computer program is stored, and when the computer program is executed, the steps provided in the above embodiments can be implemented. The storage medium can include: USB flash drives, portable hard drives, Read Only Memory (ROM), Random Access Memory (RAM), disks or CDs, and other media that can store program code.

The present disclosure also provides an electronic device that may include a memory and a processor, wherein a computer program is stored in the memory, and when the processor calls the computer program in the memory, the steps provided in the above embodiment can be implemented. Of course, the electronic device can also include various network interfaces, power supplies, and other components.

The various embodiments in this manual are described in a parallel or progressive manner, and each embodiment focuses on the differences from other embodiments. The same or similar parts between each embodiment can be referred to each other. For the device disclosed in the embodiments, the description is relatively simple as it corresponds to the method disclosed in the embodiments. Please refer to the method section for relevant information.

Those of ordinary skill in the art can also understand that the units and algorithm steps of each example described in combination with the disclosed embodiments in this article can be implemented in electronic hardware, computer software, or a combination of the two. In order to clearly illustrate the interchangeability of hardware and software, the composition and steps of each example have been described in general terms of functionality in the above description. Whether these functions are executed in hardware or software depends on the specific application and design constraints of the technical solution. Professional technicians may use different methods to achieve the described functions for each specific application, but such implementation should not be considered beyond the scope of the present disclosure.

The steps of the method or algorithm described in conjunction with the disclosed embodiments in this article can be directly implemented using hardware, software modules executed by processors, or a combination of both. Software modules can be placed in random access memory (RAM), memory, read-only memory (ROM), electrically programmable ROM, electrically erasable programmable ROM, registers, hard drives, removable disks, CD-ROM, or any other form of storage medium known in the technical field.

It should also be noted that in this description, relational terms such as first and second are only used to distinguish one entity or operation from another entity or operation, and do not necessarily require or imply any actual relationship or order between these entities or operations. Moreover, the terms "including", "including", or any other variation thereof are intended to encompass non-exclusive inclusion, such that a process, method, item, or device that includes a series of elements not only includes those elements, but also includes other elements that are not explicitly listed, or also includes elements inherent to such process, method, item, or device. Without further limitations, the elements limited by the statement "including one . . . " do not exclude the existence of other identical elements in the process, method, item, or device that includes the said elements.

The invention claimed is:

1. A smart device control method, being applied to a head-mounted smart device comprising a first positioning device and a second positioning device that are symmetrically arranged, the head-mounted smart device being worn by a wearer, the method comprising:

receiving a device control instruction, and acquiring device distance information between the first positioning device and each external smart device and between the second positioning device and each external smart device;

calculating a LOS (Line of Sight) deviation angle between the wearer and each external smart device based on the device distance information, wherein the LOS deviation angle is an angle between the wearer's direct LOS and a relative direction of an external smart device, and the relative direction of the external smart device is a direction of a line connecting a midpoint of a connection between the first positioning device and the second positioning device to the external smart device; and determining an external smart device with a LOS deviation angle less than a pre-set value as a to-be-controlled device, and sending the device control instruction to the to-be-controlled device;

wherein determining an external smart device with a LOS deviation angle less than a pre-set value as a to-be-controlled device comprises:

setting the external smart device with a LOS deviation angle less than the pre-set value as a candidate external smart device, if there are more than one candidate external smart device, acquiring a pitch angle of the wearer; and determining the to-be-controlled device from candidate external smart devices according to the pitch angle of the wearer, wherein the pitch angle of the wearer is within a pre-set pitch angle range corresponding to the to-be-controlled device.

2. The smart device control method according to claim 1, wherein acquiring the pitch angle of the wearer comprises:

acquiring spatial position coordinates of the first positioning device, the second positioning device, and a third positioning device on the head-mounted smart device, wherein connection lines between the first positioning device, the second positioning device, and the third positioning device are not collinear; and determining the pitch angle of the wearer according to the spatial position coordinates of the first positioning device, the second positioning device, and the third positioning device.

3. The smart device control method according to claim 1, wherein acquiring the pitch angle of the wearer comprises:

acquiring motion data collected by an inertial sensor on the head-mounted smart device, and calculating the pitch angle of the wearer based on the motion data.

4. The smart device control method according to claim 1, wherein before sending the device control instruction to the to-be-controlled device, the method further comprises:

acquiring a distance between a fourth positioning device on the head-mounted smart device and the to-be-controlled device, wherein connection lines between the first positioning device, the second positioning device, and the fourth positioning device are not collinear;

determining whether the wearer's LOS direction is towards the to-be-controlled device based on the distance between the fourth positioning device and the to-be-controlled device, and the distance between the first positioning device or the second positioning device and the to-be-controlled device;

if yes, performing an operation of sending the device control instruction to the to-be-controlled device; or if not, the head-mounted smart device executing the device control instruction.

5. A smart device control method, applied to an external smart device, and the method comprises:

receiving a device control instruction, and acquiring device distance information between a first positioning device on a head-mounted smart device and the external smart device and between a second positioning device on the head-mounted smart device and the external smart device, wherein the first positioning device and the second positioning device are symmetrically arranged on two sides of the head-mounted smart device;

calculating a LOS deviation angle between a wearer of the head-mounted smart device and the external smart device based on the device distance information, wherein the LOS deviation angle is an angle between the wearer's direct LOS direction and the relative direction of the external smart device, and the relative direction of the external smart device is a direction of a line connecting a midpoint of a connection between the first positioning device and the second positioning device to the external smart device;

determining whether the LOS deviation angle is less than a pre-set value:

if yes, executing an operation corresponding to the device control instruction; or if not, refraining from responding to the device control instruction;

wherein before executing the operation corresponding to the device control instruction, the method further comprises:

acquiring a distance between a fifth positioning device on the head-mounted smart device and the external smart device, wherein connection lines between the first positioning device, the second positioning device, and the fifth positioning device are not collinear; and determining whether the wearer's LOS direction is towards the external smart device based on the distance between the fifth positioning device and the external smart device, and the distance between the first positioning device or the second positioning device and the external smart device;

if yes, proceed to executing an operation corresponding to the device control instruction; or if not, refraining from responding to the device control instruction.

6. The smart device control method according to claim 5, wherein before executing the operation corresponding to the device control instruction, the method further comprises:

acquiring a pitch angle of the wearer;

judging whether the pitch angle of the wearer is within a pre-set pitch angle range:

if yes, proceed to executing an operation corresponding to the device control instruction; or if not, refraining from responding to the device control instruction.

7. A smart device control system being applied to a head-mounted smart device comprising a first positioning device and a second positioning device that are symmetrically arranged, the system comprising:

a distance acquisition module configured to receive a device control instruction and acquire device distance information between the first positioning device and each external smart device and between the second positioning device and each external smart device;

an angle calculation module configured to calculate a LOS deviation angle between a wearer of the head-mounted smart device and each external smart device based on the device distance information, wherein the LOS deviation angle is an angle between the wearer's direct LOS and a relative direction of an external smart device, and the relative direction of the external smart device is a direction of a line connecting a midpoint of a connection between the first positioning device and the second positioning device to the external smart device; and an instruction sending module configured to determine an external smart device with a LOS deviation angle less than a pre-set value as a to-be-controlled device, and send a device control instruction to the to-be-controlled device, wherein the instruction sending module configured to determine an external smart device with a LOS deviation angle less than a pre-set value as a to-be-controlled device comprises being configured to:

set the external smart device with a LOS deviation angle less than the pre-set value as a candidate external smart device;

if there are more than one candidate external smart device, acquire a pitch angle of the wearer; and determine the to-be-controlled device from candidate external smart devices according to the pitch angle of the wearer, wherein the pitch angle of the wearer is within a pre-set pitch angle range corresponding to the to-be-controlled device.

8. An electronic device, characterized by comprising a memory and a processor, wherein the memory stores therein a computer program, and the processor calls the computer program in the memory to implement a smart device control method according to claim 1.

9. A storage medium, characterized by having computer-executable instructions stored therein, wherein, the instructions are loaded and executed by a processor to implement a smart device control method according to claim 1.

* * * * *